(12) United States Patent
Yu et al.

(10) Patent No.: US 8,434,771 B2
(45) Date of Patent: May 7, 2013

(54) PISTON-TYPE ACTUATOR AND STATIC FLUID DAMPER AND VEHICLES INCLUDING SAME

(75) Inventors: Jinghong Yu, Dublin, OH (US); Hiroyuki Tokunaga, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 13/159,778

(22) Filed: Jun. 14, 2011

(65) Prior Publication Data

US 2012/0319376 A1    Dec. 20, 2012

(51) Int. Cl.
| | |
|---|---|
| B60G 13/06 | (2006.01) |
| B60G 15/06 | (2006.01) |
| B60G 11/56 | (2006.01) |
| B60G 17/08 | (2006.01) |
| F16F 9/32 | (2006.01) |

(52) U.S. Cl.
USPC ............ 280/124.154; 188/266.2; 188/314; 280/5.515; 280/124.16; 280/124.161; 280/124.162

(58) Field of Classification Search ........... 188/266.2, 188/313, 314, 318; 280/5.5, 5.507, 5.508, 280/5.512, 5.515, 124.106, 124.109, 124.11–124.114, 280/124.135, 124.136, 124.141, 124.145, 280/124.154, 124.157–124.162, 124.179
See application file for complete search history.

(56) References Cited

U.S. PATENT DOCUMENTS

| | | | |
|---|---|---|---|
| 3,563,566 A * | 2/1971 | Weber | 280/124.112 |
| 3,752,497 A * | 8/1973 | Enke et al. | 280/5.509 |
| 3,900,042 A * | 8/1975 | Unruh et al. | 137/38 |
| 4,277,076 A * | 7/1981 | Hanna | 280/5.508 |
| 4,606,551 A * | 8/1986 | Toti et al. | 280/124.161 |
| 4,702,490 A * | 10/1987 | Yamaguchi et al. | 280/5.515 |
| 4,761,020 A * | 8/1988 | Eckel et al. | 267/64.11 |
| 4,761,022 A | 8/1988 | Ohashi et al. | |
| 4,787,649 A | 11/1988 | Watanabe et al. | |
| 4,830,398 A * | 5/1989 | Williams et al. | 280/124.157 |
| 4,966,390 A | 10/1990 | Lund et al. | |
| 5,016,909 A | 5/1991 | Lin | |

(Continued)

FOREIGN PATENT DOCUMENTS

DE    3337255    2/1985

OTHER PUBLICATIONS

International Search Report and Written Opinion of the International Searching Authority for International Application Serial No. PCT/US2012/32883, dated Jun. 27, 2012, 7 pages, in its entirety.

*Primary Examiner* — Joseph Rocca
*Assistant Examiner* — Laura Freedman
(74) *Attorney, Agent, or Firm* — Ulmer & Berne LLP

(57) ABSTRACT

A vehicular fluid damper system comprises a piston-type actuator, a static fluid damper, first and second flow passages, a first flow control valve, and a controller. The piston-type actuator comprises a cylinder and a piston that cooperate with one another to define first and second chambers. The static fluid damper defines first, second, and third dampening chambers. The first and second dampening chambers are in fluid communication with one another. The second and third dampening chambers are in fluid communication with each other. The first flow passage is in fluid communication with the first dampening chamber and the first chamber. The second flow passage is in fluid communication with the second dampening chamber and the second chamber. The controller is configured to facilitate operation of the first flow control valve to change a flow rate of fluid through the first flow passage.

20 Claims, 2 Drawing Sheets

U.S. PATENT DOCUMENTS

| | | | | |
|---|---|---|---|---|
| 5,040,823 A | | 8/1991 | Lund | |
| 5,046,755 A | * | 9/1991 | Runkel et al. | 280/124.101 |
| 5,056,811 A | | 10/1991 | Fukunaga et al. | |
| 5,062,660 A | | 11/1991 | Satoh et al. | |
| 5,082,308 A | | 1/1992 | Jones | |
| 5,089,966 A | | 2/1992 | Fukushima et al. | |
| 5,219,181 A | | 6/1993 | Lund | |
| 5,401,053 A | * | 3/1995 | Sahm et al. | 280/5.502 |
| 5,486,018 A | * | 1/1996 | Sakai | 280/124.16 |
| 5,653,315 A | | 8/1997 | Ekquist et al. | |
| 5,682,980 A | | 11/1997 | Reybrouck | |
| 5,785,344 A | * | 7/1998 | Vandewal et al. | 267/64.16 |
| 6,092,816 A | | 7/2000 | Sekine et al. | |
| 6,196,555 B1 | | 3/2001 | Gaibler | |
| 6,267,387 B1 | * | 7/2001 | Weiss | 280/5.52 |
| 6,540,051 B2 | | 4/2003 | Grundei | |
| 6,556,907 B1 | | 4/2003 | Sakai | |
| 6,575,484 B2 | | 6/2003 | Rogala et al. | |
| 6,598,891 B2 | | 7/2003 | Sakai | |
| 6,669,216 B1 | | 12/2003 | Elser et al. | |
| 7,044,482 B2 | | 5/2006 | Shore | |
| 7,150,457 B2 | | 12/2006 | Rautenbach | |
| 7,168,720 B2 | | 1/2007 | Fontdecaba | |
| 7,210,688 B2 | * | 5/2007 | Kobayashi | 280/5.505 |
| 7,360,777 B2 | | 4/2008 | Mizuno et al. | |
| 7,497,452 B2 | | 3/2009 | Schedgick | |
| 7,658,393 B2 | | 2/2010 | Fontdecaba | |
| 2008/0179148 A1 | | 7/2008 | Quinn et al. | |
| 2010/0013174 A1 | | 1/2010 | Buma et al. | |
| 2010/0019060 A1 | | 1/2010 | Bittner | |
| 2011/0025000 A1 | | 2/2011 | Inoue et al. | |

* cited by examiner

PISTON-TYPE ACTUATOR AND STATIC FLUID DAMPER AND VEHICLES INCLUDING SAME

TECHNICAL FIELD

A vehicular fluid damper system includes a piston-type actuator and a static fluid damper that are in fluid communication with each other via first and second flow passages.

BACKGROUND

Conventional vehicular suspension systems can include a plurality of linear-type cushion members each having a shock absorber and a suspension spring disposed circumferentially about the shock absorber (e.g., in a coil-over damper-type arrangement). Typically each linear-type cushion member is installed between a frame and either a control arm or a wheel knuckle.

SUMMARY

In accordance with one embodiment, a vehicle comprises a frame, a support arm, a wheel, a piston-type actuator, a static fluid damper, a first flow passage, a first flow control valve, a second flow passage, and a controller. The support arm is pivotally coupled with the frame. The wheel is rotatably coupled with the support arm. The piston-type actuator comprises a cylinder, a piston, and a piston rod. The piston is disposed at least partially within the cylinder and is slideable with respect to the cylinder. The piston and the cylinder cooperate with one another to define a first chamber and a second chamber. The piston rod is coupled with the piston. The piston rod is coupled with one of the frame and the support arm. The cylinder is coupled with the other of the frame and the support arm. The static fluid damper is coupled with the frame and defines a first dampening chamber, a second dampening chamber, and a third dampening chamber. The first dampening chamber and the second dampening chamber are in fluid communication with one another. The second dampening chamber and the third dampening chamber are in fluid communication with each other. The first flow passage is in fluid communication with the first dampening chamber and the first chamber. The first flow control valve is in fluid communication with the first flow passage and is operable to control a flow rate of fluid through the first flow passage. The second flow passage is in fluid communication with the second dampening chamber and the second chamber. The controller is coupled with the first flow control valve and is configured to facilitate operation of the first flow control valve to change the flow rate of fluid through the first flow passage.

In accordance with another embodiment, a vehicle comprises a frame, a support arm, a wheel, a piston-type actuator, a static fluid damper, a first flow passage, and a second flow passage. The support arm is pivotally coupled with the frame and is pivotable about a first axis. The wheel is rotatably coupled with the support arm. The piston-type actuator comprises a cylinder, a piston, and a piston rod. The piston is disposed at least partially within the cylinder and is slideable with respect to the cylinder. The piston and the cylinder cooperate with one another to define a first chamber and a second chamber. The piston rod is coupled with the piston. The static fluid damper is separately spaced from the piston-type actuator and defines a first dampening chamber and a second dampening chamber. The first dampening chamber and the second dampening chamber are in fluid communication with one another. The first flow passage is in fluid communication with the first dampening chamber and the first chamber. The second flow passage is in fluid communication with the second dampening chamber and the second chamber. One of the piston rod and the support arm is pivotally coupled with the frame and are pivotable about a second axis. The other of the piston rod and the support arm is pivotally coupled with the support arm and pivotable about a third axis. The second axis and the third axis reside in a plane. At least a portion of the cylinder is located on one side of the plane. At least a portion of the static fluid damper is located on the other side of the plane.

In accordance with yet another embodiment, a vehicular fluid damper system comprises a piston-type actuator, a static fluid damper, a first flow passage, a first flow control valve, a second flow passage, and a controller. The piston-type actuator comprises a cylinder and a piston. The piston is disposed at least partially within the cylinder and is slideable with respect to the cylinder. The piston and the cylinder cooperate with one another to define a first chamber and a second chamber. The static fluid damper is spaced separately from the piston-type actuator and defines a first dampening chamber, a second dampening chamber, and a third dampening chamber. The first dampening chamber and the second dampening chamber are in fluid communication with one another. The second dampening chamber and the third dampening chamber are in fluid communication with each other. The first flow passage is in fluid communication with the first dampening chamber and the first chamber. The first flow control valve is in fluid communication with the first flow passage and is operable to control a flow rate of fluid through the first flow passage. The second flow passage is in fluid communication with the second dampening chamber and the second chamber. The controller is coupled with the first flow control valve and is configured to facilitate operation of the first flow control valve to change the flow rate of fluid through the first flow passage.

BRIEF DESCRIPTION OF THE DRAWINGS

Various embodiments will become better understood with regard to the following description, appended claims and accompanying drawings wherein:

DETAILED DESCRIPTION

Figure 1:
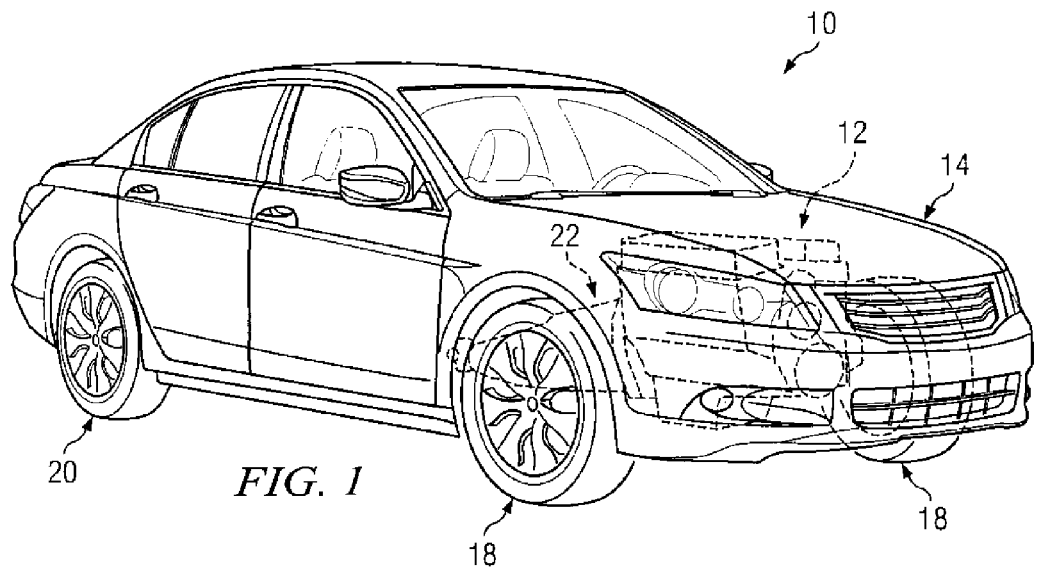
FIG. 1 is a front perspective view depicting a vehicle that includes a fluid damper system, in accordance with one embodiment.

Embodiments are hereinafter described in detail in connection with the views of FIGS. 1-4, wherein like numbers indicate the same or corresponding elements throughout the views. In one embodiment, and as depicted in FIG. 1, a vehicle 10 can include an engine 12 that can be provided within an engine compartment 14. The vehicle 10 can also include front wheels 18 and rear wheels (e.g., 20). The vehicle 10 can comprise a transmission 22 that couples the engine 14 with one or more of the wheels (e.g., 18, 20) of the vehicle 10. The transmission 22 can be coupled to the engine 14 such that power from the engine 14 can be transmitted through the transmission 22, to a drivetrain (not shown) and to the wheels (e.g., 18, 20) to propel the vehicle 10. The transmission 22 can be operable in any one of a plurality of gears to facilitate operation of the vehicle 10 at different speeds.

Figure 2:
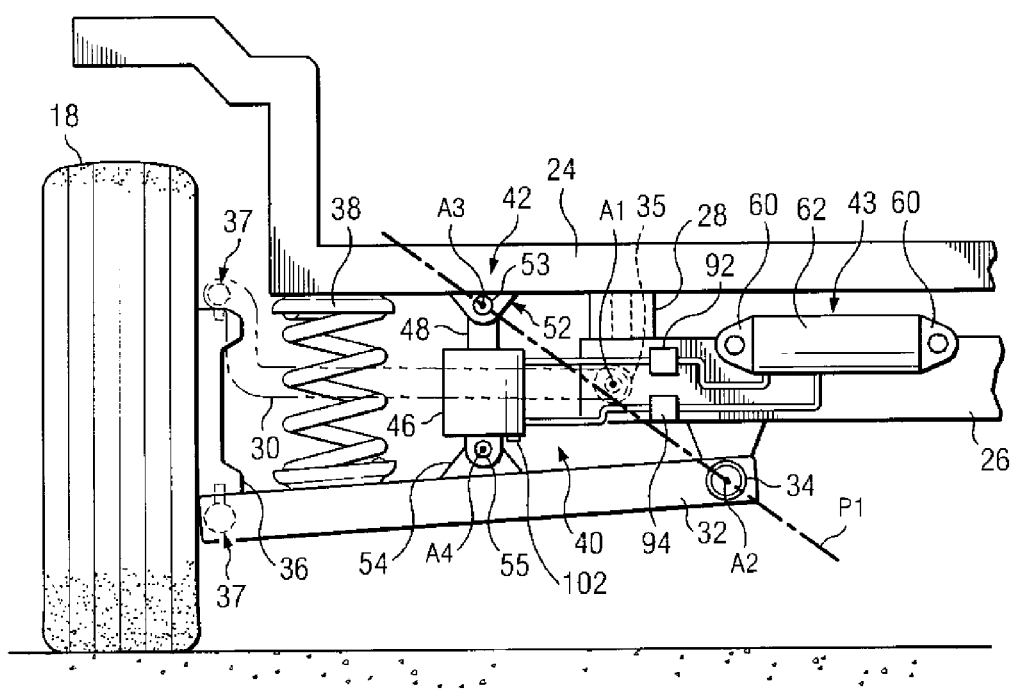
FIG. 2 is an enlarged view depicting the fluid damper system and certain associated components of the vehicle of FIG. 1, in accordance with one embodiment, wherein other components of the vehicle have been removed for clarity of illustration.

As illustrated in FIG. 2, the vehicle 10 can include a frame 24 and a subframe 26. The subframe 26 can underlie the frame 24 and can be coupled to the frame 24 by bolts (not shown) and a mounting bushing 28. The mounting bushing 28, or a plurality of mounting bushings, can be interposed between the frame 24 and the subframe 26 and can be configured to allow passage of one of the bolts. In one embodiment, the mounting bushings (e.g., 28) can comprise an elastomeric annular ring.

The vehicle 10 can include an upper support arm 30 and a lower support arm 32 that are each pivotally coupled (e.g., directly or indirectly) with the frame 24. In one embodiment, as illustrated in FIG. 2, the upper and lower support arms 30, 32 can each be pivotally attached to the subframe 26 with control arm bushings 34, 35 such that they are pivotable about axes A1 and A2, respectively. A wheel knuckle 36 can be pivotally coupled with each of the upper and lower support arms 30, 32 by a pair of control arm ball joints 37. The wheel knuckle 36 can rotatably couple one of the front wheels (e.g., 18) with the upper and lower support arms 30, 32. It will be appreciated that the control arm ball joints 37 can cooperate to facilitate pivoting of the wheel knuckle 36 about a king pin axis. In one embodiment, a tie rod (not shown) can couple the wheel knuckle 36 with a steering assembly (not shown). In such an embodiment, operation of the steering assembly can facilitate pivoting of the wheel knuckle 36 about the king pin axis to steer the vehicle 10. During operation of the vehicle 10, the upper and lower support arms 30, 32 can pivot with respect to the subframe 26 to accommodate upward and downward movement of the front wheel 18.

A suspension spring 38 can be interposed between, and coupled with, the frame 24 and lower support arm 32. The suspension spring 38 can be configured to resist upward pivoting of the lower support arms 32 with respect to the frame 24. In one embodiment, the upper support arm 30 can be configured, such as in an A-arm type arrangement, for example, to allow the suspension spring 38 to pass through the upper support arm 30.

In one embodiment, as illustrated in FIG. 2, the vehicle 10 can include a fluid damper system 40 that includes a piston-type actuator 42 and a static fluid damper 43. The piston-type actuator 42 can be interposed vertically between, and coupled with, the frame 24 and the lower support arm 32. In one embodiment, as illustrated in FIG. 2, the piston-type actuator 42 can be disposed between the subframe 26 and the suspension spring 38.

Figure 3:
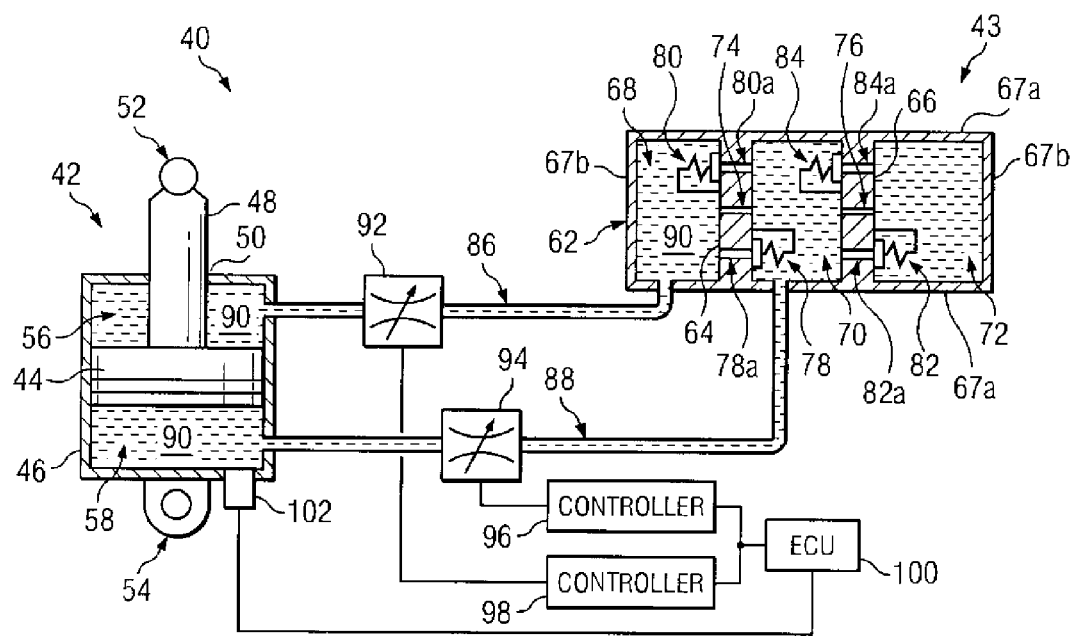
FIG. 3 is a schematic view depicting the fluid damper system in association with controllers and an electronic control unit (ECU)

As illustrated in FIG. 3, the piston-type actuator 42 can comprise a piston 44 and a cylinder 46. The piston 44 can be disposed at least partially within the cylinder 46 and can be slideable with respect to the cylinder 46. A piston rod 48 can be coupled with the piston 44 and can extend through an upper opening 50 defined by the cylinder 46. A seal (not shown) can be interposed between the piston rod 48 and the upper opening 50 to prevent fluid from leaking from the upper opening 50. The piston rod 48 can define a coupling end 52 and the cylinder 46 can include a coupling bracket 54. Mounting bushings (not shown) can be integrated into each of the coupling end 52 and the coupling bracket 54. In one embodiment, as illustrated in FIG. 2, the coupling end 52 of the piston rod 48 can be pivotally coupled with the frame 24 (e.g., with pin 53) and pivotable about an axis A3. The coupling bracket 54 of the cylinder 46 can be pivotally coupled with the lower support arm 32 (e.g., with pin 55) and pivotable about an axis A4. In another embodiment, the piston-type actuator 42 can be inverted such that the coupling bracket 54 of the cylinder 46 is pivotally coupled with the frame 24 (e.g., with pin 53) and the coupling end 52 of the piston rod 48 is pivotally coupled with the lower support arm 32 (e.g., with pin 55).

The piston 44 and the cylinder 46 can cooperate with each other to define a first chamber 56 and a second chamber 58. When the upper and lower support arms 30, 32 pivot with respect to the subframe 26, the piston 44 can slide with respect to the cylinder 46 (e.g., upwardly and downwardly) which can change the volume of each of the first and second chambers 56, 58.

The static fluid damper 43 can be coupled with the frame 24. In one embodiment, as illustrated in FIG. 2, the static fluid damper 43 can be attached to the subframe 26. The static fluid damper 43 can include a pair of outer coupling flanges 60 that facilitate attachment to the subframe 26 with bolts or through welding, for example. The static fluid damper 43 is shown to be coupled with the subframe 26 in a substantially horizontal arrangement. In another embodiment, the static fluid damper 43 can be attached to the cylinder 46 of the piston-type actuator 42. It will be appreciated that a static fluid damper 43 can be coupled with a frame of a vehicle in any of a variety of suitable alternative arrangements.

The piston-type actuator 42 and the static fluid damper 43 are shown to be provided as a two-piece construction. In one embodiment, as illustrated in FIG. 2, the piston-type actuator 42 and the static fluid damper 43 are spaced separately from each other. As illustrated in FIG. 2, the second and third axes A2, A3 can reside in a plane P1. The static fluid damper 43 can be spaced from the piston-type actuator 42 such that the entire cylinder 46 can reside on one side of the plane P1 and the static fluid damper 43 can reside on the other side of the plane P1. In another embodiment, the piston-type actuator 42 and the static fluid damper 43 can be spaced separately apart from each other such that only a portion of the cylinder 46 resides on one side of the plane P1 and the static fluid damper 43 resides on the other side of the plane P1. In another embodiment, the static fluid damper 43 can be mounted to the cylinder 46 and in contact with an outer surface of the cylinder 46. It will be appreciated that the fluid damper system 40 can accordingly occupy less vertical space beneath the frame 24 than would otherwise be available for some conventional cushion members (e.g., linear-type cushion members). The height and/or width of the passenger compartment can accordingly be improved without significantly affecting the height of the vehicle.

The static fluid damper 43 can include an outer body 62, a first inner wall 64, and a second inner wall 66. The outer body 62 can include a sidewall 67a and a pair of end walls 67b. In one embodiment, the first and second inner walls 64, 66 can be rigidly attached to the sidewall 67a, such as through welding or as a one-piece construction, for example. The first and second inner walls 64, 66 are shown to extend inwardly and transversely from the sidewall 67a of the outer body 62. In one embodiment, the first and second inner walls 64, 66 can be substantially perpendicular to the sidewall 67a of the outer body 62 (e.g., at an angle of between about 85 degrees and about 95 degrees). In one embodiment, the sidewall 67a of the outer body 62 can be substantially cylindrical, but in other embodiments can comprise any of a variety of suitable alternative arrangements.

The outer body 62, the first inner wall 64, and the second inner wall 66 can cooperate to define a first dampening chamber 68, a second dampening chamber 70, and a third dampening chamber 72. The first and second dampening chambers 68, 70 can be in fluid communication with one another and the second and third dampening chambers 70, 72 can be in fluid communication with one another. In one embodiment, as illustrated in FIG. 3, the first inner wall 64 can define a first orifice 74 that facilitates fluid communication between the first and second dampening chambers 68, 70. Similarly, the second inner wall 66 can define a second orifice 76 that facilitates fluid communication between the second and third dampening chambers 70, 72.

In one embodiment, as illustrated in FIG. 3, the static fluid damper 43 can comprise a first valve 78, a second valve 80, a third valve 82, and a fourth valve 84. The first and second valves 78, 80 can include respective valve passages 78a, 80a and can cooperate to facilitate fluid flow between the first and second dampening chambers 68, 70. The third and forth valves 82, 84 can include respective valve passages 82a, 84a and can cooperate to facilitate fluid flow between the second and third dampening chambers 70, 72. In one embodiment, the first, second, third, and fourth valves 78, 80, 82, 84 can each comprise a check valve. In such an embodiment, the first valve 78 can selectively permit fluid flow from the first dampening chamber 68 to the second dampening chamber 70 but can prevent fluid flow from the second dampening chamber 70 to the first dampening chamber 68. The second valve 80 can selectively permit fluid flow from the second dampening chamber 70 to the first dampening chamber 68 but can prevent fluid flow from the first dampening chamber 68 to the second dampening chamber 70. The third valve 82 can selectively permit fluid flow from the second dampening chamber 70 to the third dampening chamber 72 but can prevent fluid flow from the third dampening chamber 72 to the second dampening chamber 70. The fourth valve 84 can selectively permit fluid flow from the third dampening chamber 72 to the second dampening chamber 70 but can prevent fluid flow from the second dampening chamber 70 to the third dampening chamber 72.

As illustrated in FIG. 3, a first flow passage 86 can be in fluid communication with the first chamber 56 of the piston-type actuator 42 and the first dampening chamber 68 of the static fluid damper 43 such that the first chamber 56 and the first dampening chamber 68 are in fluid communication with one another. A second flow passage 88 can be in fluid communication with the second chamber 58 of the piston-type actuator 42 and the second dampening chamber 70 of the static fluid damper 43 such that the second chamber 58 and the second dampening chamber 70 are in fluid communication with each other.

The fluid damper system 40 can include hydraulic fluid 90 which in some embodiments can comprise hydraulic oil or air. When the piston 44 moves with respect to the cylinder 46, the hydraulic fluid 90 can facilitate dampening of the piston 44. For example, movement of the piston downwardly, such as when the front wheel 18 moves suddenly upwardly as a result of encountering uneven terrain can cause the hydraulic fluid 90 from the second chamber 58 of the piston-type actuator 42 to flow into the second dampening chamber 70 of the static fluid damper 43 (e.g., through the second flow passage 88). The hydraulic fluid 90 can be distributed to the first and third dampening chambers 68, 72 by the first orifice 74, the second orifice 76, the second valve 80, and the third valve 82.

The hydraulic fluid 90 from the first dampening chamber 68 can be transmitted into the first chamber 56 of the piston-type actuator 42. The first orifice 74, the second orifice 76, the second valve 80, and the third valve 82 can cooperate to limit fluid flow from the second dampening chamber 70 to the first and third dampening chambers 68, 72 which can impart a dampening force to the piston 44 (e.g., a differential pressure between the first and second chambers 56, 58). It will be appreciated that the first orifice 74, the second orifice 76, the second valve 80, and the third valve 82 can be configured in any of a variety of suitable arrangements to facilitate effective dampening of movement of the piston during operation of the vehicle 10.

Conversely, when the piston 44 moves upwardly with respect to the cylinder 46, such as when the front wheel 18 is moving downwardly to maintain contact with a roadway, the hydraulic fluid 90 from the first chamber 56 of the piston-type actuator 42 can flow into the first dampening chamber 68 of the static fluid damper 43 (e.g., through the first flow passage 86). The hydraulic fluid 90 can be distributed to the second and third dampening chambers 70, 72 (e.g., first to the second dampening chamber 70 and then to the third dampening chamber 72) by the first orifice 74, the second orifice 76, the first valve 78, and the third valve 82. The hydraulic fluid 90 from the second dampening chamber 70 can be transmitted into the second chamber 58 of the piston-type actuator 42. The first orifice 74, the second orifice 76, the first valve 78, and the third valve 82 can cooperate to permit fluid flow from the first chamber 56 to the second chamber 58. It will be appreciated that the first orifice 74, the second orifice 76, the first valve 80, and the third valve 82 can be configured to facilitate effective fluid flow from the first chamber 56 to the second chamber 58, to permit the piston 44 to move upwardly.

The size of the first and second orifices and the cracking pressure of each of the first, second, third, and fourth valves 78, 80, 82, 84 can be selected to achieve effective dampening of the piston 44. In some embodiments, the first and second inner walls 64, 66 might not include first and second orifices 74, 76.

A three-dampening chamber arrangement of the static fluid damper 43, as shown in FIG. 3 and described above can facilitate more effective dampening of the piston 44 than a two-dampening chamber arrangement. For example, when the piston 44 moves downwardly, the hydraulic fluid 90 from the second flow passage 88 can flow into the first and second orifices 74, 76 and to the second and third dampening chambers 70, 72, respectively. The configuration of the first and second orifices 74, 76 can be individually selected to provide effective dampening of the piston 44. Moreover, by distributing the hydraulic fluid 90 between the second and third dampening chambers 70, 72, the second dampening chamber 70 is less susceptible to being at full capacity (e.g., completely or substantially completely filled with hydraulic fluid 90) which can affect subsequent upward movement of the piston 44. It will be appreciated that in some embodiments, a static fluid damper can include only two dampening chambers or more than three dampening chambers.

As illustrated in FIGS. 2 and 3, a first flow control valve 92 can be in fluid communication with the first flow passage 86 and a second flow control valve 94 can be in fluid communication with the second flow passage 88. In one embodiment, as illustrated in FIG. 2, the first flow passage 86, the second flow passage 88, the first flow control valve 92, and the second flow control valve 94 can be mounted to the subframe 26 such as with mounting brackets (not shown), for example. In one embodiment, the first and second flow passages 86, 88 can comprise flexible-type tubing, such as a flexible metal hose, for example. In such an embodiment, the portions of the first and second flow passages 86, 88 that extend beyond the end of the subframe 26 and the piston-type actuator 42 are able to move with the piston-type actuator 42 when the lower support arm 32 pivots with respect to the frame 24.

The first and second control valves 92, 94 can each be operable to control a flow rate of the hydraulic fluid 90 through the first and second flow passages 86, 88, respectively. In one embodiment, as illustrated in FIG. 3, first and second controllers 96, 98 can be electrically coupled with the first and second flow control valves 92, 94, respectively. The first and second controllers 96, 98 can each be configured to facilitate operation of the first and second flow control valves 92, 94, respectively. The first and second controllers 96, 98 can be electrically coupled with an electronic control unit (ECU) 100. The ECU 100 can be configured to selectively generate command signals to the first and second controllers 96, 98 to facilitate control over the first and second flow control valves 92, 94. In one embodiment, the first and second controllers 96, 98 and the ECU 100 can be integrated together as a single control unit. It will be appreciated that the first and second controllers 96, 98 can be electrically coupled with any of a variety of suitable alternative central controllers such as a power-train control module (PCM), or an engine control module (ECM), for example.

As illustrated in FIG. 3, a piston movement sensor 102 can be coupled with the piston-type actuator 42. The piston movement sensor 102 can be electrically coupled with the ECU 100 and configured to generate a piston movement signal according to movement of the piston 44. The ECU 100 can be configured to operate the first and second flow control valves 92, 94 in response to the piston movement signal from the piston movement sensor 102 to change the flow rate of the hydraulic fluid 90 through the first and second flow passages 86, 88.

In one embodiment, the piston movement sensor 102 can comprise a pressure sensor that is configured to generate a fluid pressure signal according to a fluid pressure of the second chamber 58 of the piston-type actuator 42. In such an embodiment, the ECU 100 can be configured to facilitate operation the first and second flow control valves 92, 94 in response to the fluid pressure signal from the pressure sensor to change the flow rate of the hydraulic fluid 90 through the first and second flow passages 86, 88. For example, when the pressure of the second chamber 58 is below a threshold value (e.g., 3000 kiloPascals), the ECU 100 can facilitate operation of the first and second flow control valves 92, 94 in respective fully opened positions. Once the pressure of the second chamber 58 exceeds the threshold value, the ECU 100 can facilitate operation of the first and second flow control valves 92, 94 to restrict the flow rate of the hydraulic fluid 90 through the first and second flow passages 86, 88. It will be appreciated that a pressure sensor can be provided in any of a variety of suitable alternative arrangements. For example, the pressure sensor can be associated with the first chamber 56 to facilitate detection of the fluid pressure of the first chamber 56.

In another embodiment, the piston movement sensor 102 can comprise a piston velocity sensor that is configured to generate a velocity signal according to a velocity of the piston 44. In such an embodiment, the ECU 100 can be configured to facilitate operation the first and second flow control valves 92, 94 in response to the velocity signal from the piston velocity sensor to change the flow rate of the hydraulic fluid 90 through the first and second flow passages 86, 88. For example, when the downward velocity of the piston is below a threshold value (e.g., 1 foot per second), the ECU 100 can facilitate operation of the first and second flow control valves 92, 94 in fully opened positions. Once the velocity of the piston 44 exceeds the threshold value, the ECU 100 can facilitate operation of the first and second flow control valves 92, 94 to restrict the flow rate of the hydraulic fluid 90 through the first and second flow passages 86, 88. It will be appreciated that a piston velocity sensor can be provided in any of a variety of suitable alternative arrangements. For example, the piston velocity sensor can be directly coupled with the piston 44 to facilitate detection of the velocity of the piston 44 with respect to the cylinder 46.

It will be appreciated that selectively changing the flow rate of the hydraulic fluid 90 through the first flow passage 86 and/or the second flow passage 88 can facilitate effective control over the dampening characteristics of the fluid damper system 40. It will also be appreciated that the first and second control flow valves 92, 94 can be controlled according to any of a variety of additional or alternative vehicular conditions, such as for example, vehicular lateral acceleration (e.g., during steering), vehicular speed, and/or according to user selection (e.g., through manual operation of a multi-position switch). It will further be appreciated that the first and second flow control valves can be controlled together or independent of one another. For example, in an alternative embodiment, the fluid damper system 40 can operate only one of the first and second control valves 92, 94 to change the flow rate of the hydraulic fluid 90 through the first and second flow passages 86, 88, respectively.

Figure 4:
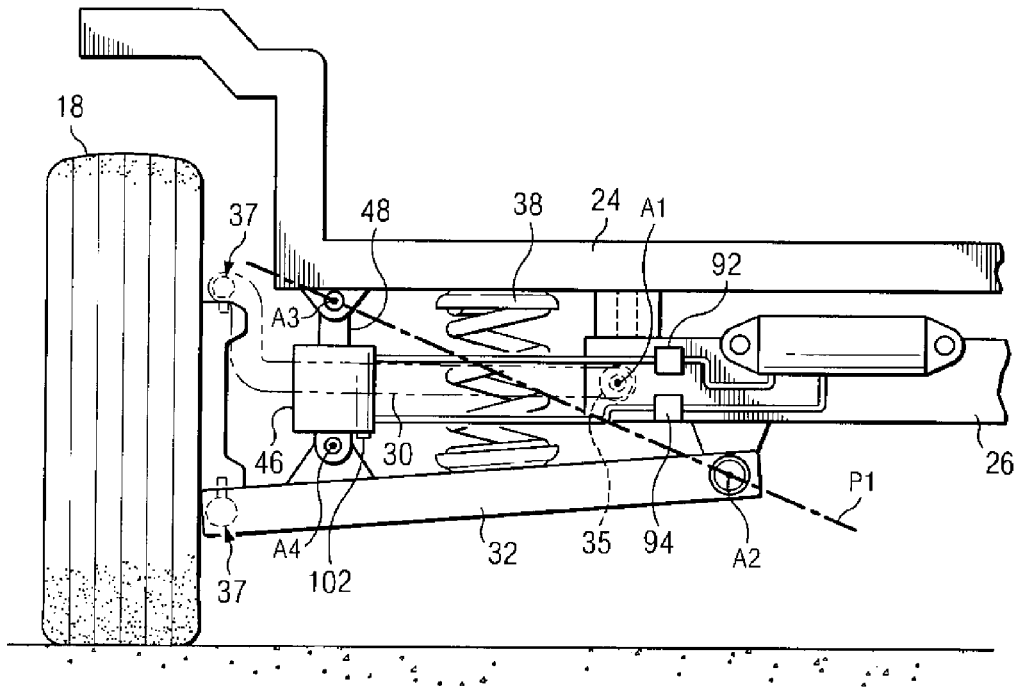
FIG. 4 is an enlarged front elevational view depicting the fluid damper system and certain associated components of the vehicle of FIG. 1, in accordance with another embodiment, wherein other components of the vehicle have been removed for clarity of illustration.

FIG. 4 illustrates a vehicle according to another embodiment. The vehicle illustrated in FIG. 4 can be similar to, or the same in many respects to the vehicle 10 shown in FIG. 2, but with the suspension spring 38 disposed between the piston-type actuator 42 and the subframe 26. Although the fluid damper system 40 is shown with respect to a left front wheel (e.g., 18), it will be appreciated that a fluid damper system can be provided in a similar arrangement for any of the wheels (e.g., 18, 20) of the vehicle 10. In certain embodiments, it will be appreciated that a wheel knuckle can comprise a non-steerable-type knuckle such as when the wheel knuckle is associated with one of the rear wheels 20.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   a frame;
   a support arm pivotally coupled with the frame;
   a left wheel rotatably coupled with the support arm;
   an actuator comprising:
   a cylinder;
   a piston disposed at least partially within the cylinder and slideable with respect to the cylinder, the piston and the cylinder cooperating with one another to define a first chamber and a second chamber; and
   a piston rod coupled with the piston, the piston rod being coupled with one of the frame and the support arm and the cylinder being coupled with the other of the frame and the support arm;

a static fluid damper coupled with the frame and defining a first dampening chamber, a second dampening chamber, and a third dampening chamber, the first dampening chamber and the second dampening chamber being in fluid communication with one another, and the second dampening chamber and the third dampening chamber being in fluid communication with one another;

a first flow passage in fluid communication with the first dampening chamber and the first chamber;

a first flow control valve in fluid communication with the first flow passage and operable to control a flow rate of fluid through the first flow passage;

a second flow passage in fluid communication with the second dampening chamber and the second chamber; and a controller coupled with the first flow control valve and configured to facilitate operation of the first flow control valve to change the flow rate of fluid through the first flow passage; wherein the static fluid damper is not in fluid communication with any actuator associated with a right wheel of the vehicle.

2. The vehicle of claim 1 further comprising a second flow control valve in fluid communication with the second flow passage and operable to control a flow rate of fluid through the second flow passage, the controller being coupled with the second flow control valve and configured to facilitate operation of the second flow control valve to change the flow rate of fluid through the second flow passage.

3. The vehicle of claim 2 wherein the actuator further comprises a pressure sensor coupled with the cylinder and configured to generate a fluid pressure signal according to a fluid pressure of one of the first chamber and the second chamber, wherein the controller is configured to change the flow of at least one of the first flow passage and the second flow passage in response to the fluid pressure signal.

4. The vehicle of claim 2 wherein the actuator further comprises a piston velocity sensor coupled with the cylinder and configured to generate a piston velocity signal according to a velocity of the piston, wherein the controller is configured to change the flow rate of fluid through at least one of the first flow passage and the second flow passage in response to the piston velocity signal.

5. The vehicle of claim 1 wherein the static fluid damper comprises:
a first valve configured to selectively permit fluid flow between the first and second dampening chambers of the static fluid damper; and
a second valve configured to selectively permit fluid flow between the second and third dampening chambers of the static fluid damper.

6. The vehicle of claim 1 wherein the static fluid damper comprises:
a first inner wall disposed between the first and second dampening chambers and defining a first orifice; and
a second inner wall disposed between the second and third dampening chambers and defining a second orifice.

7. The vehicle of claim 6 wherein the static fluid damper comprises:
a first valve configured to selectively permit fluid flow from the first dampening chamber to the second dampening chamber;
a second valve configured to selectively permit fluid flow from the second dampening chamber to the first dampening chamber;
a third valve configured to selectively permit fluid flow from the second dampening chamber to the third dampening chamber; and
a fourth valve configured to selectively permit fluid flow from the third dampening chamber to the second dampening chamber.

8. The vehicle of claim 1 wherein the static fluid damper is coupled with the frame and is spaced separately from the actuator.

9. A vehicle comprising:
a frame;
a support arm pivotally coupled with the frame and pivotable about a first axis;
a left wheel rotatably coupled with the support arm;
an actuator comprising:
a cylinder;
a piston disposed at least partially within the cylinder and slideable with respect to the cylinder, the piston and the cylinder cooperating with one another to define a first chamber and a second chamber; and
a piston rod coupled with the piston;
a static fluid damper associated with the left wheel and spaced separately from the actuator, the static fluid damper defining a first dampening chamber and a second dampening chamber, the first dampening chamber and the second dampening chamber being in fluid communication with one another;
a first flow passage in fluid communication with the first dampening chamber and the first chamber; and
a second flow passage in fluid communication with the second dampening chamber and the second chamber, and wherein:
one of the piston rod and the cylinder is pivotally coupled with the frame and is pivotable about a second axis;
the other of the piston rod and the cylinder is pivotally coupled with the support arm and is pivotable about a third axis;
the first axis and the second axis reside in a plane;
at least a portion of the cylinder is located on one side of the plane; and
at least a portion of the static fluid damper is located on the other side of the plane.

10. The vehicle of claim 9 wherein the cylinder is located entirely on one side of the plane.

11. The vehicle of claim 9 wherein the static fluid damper is located entirely on the other side of the plane.

12. The vehicle of claim 9 wherein the cylinder and the static fluid damper are located entirely on opposite sides of the plane.

13. The vehicle of claim 9 further comprising a first flow control valve in fluid communication with the first flow passage and operable to control a flow rate of fluid through the first flow passage.

14. The vehicle of claim 13 further comprising a second flow control valve in fluid communication with the second flow passage and operable to control a flow rate of fluid through the second flow passage.

15. The vehicle of claim 9 wherein the static fluid damper further defines a third dampening chamber in fluid communication with the second fluid dampening chamber.

16. A vehicular fluid damper system comprising:
an actuator comprising:
a cylinder;
a piston disposed at least partially within the cylinder and slideable with respect to the cylinder, the piston and the cylinder cooperating with one another to define a first chamber and a second chamber;
a static fluid damper spaced separately from the actuator and defining a first dampening chamber, a second dampening chamber, and a third dampening chamber, the first dampening chamber and the second dampening chamber being in fluid communication with one another, and the second dampening chamber and the third dampening chamber being in fluid communication with one another, the static fluid damper comprising:
  a first valve configured to selectively permit fluid flow from the first dampening chamber to the second dampening chamber and to prohibit fluid flow from the second dampening chamber to the first dampening chamber; and
  a second valve configured to selectively permit fluid flow from the second dampening chamber to the first dampening chamber and to prohibit fluid flow from the first dampening chamber to the second dampening chamber;
a first flow passage in fluid communication with the first dampening chamber and the first chamber;
a first flow control valve in fluid communication with the first flow passage and operable to control a flow rate of fluid through the first flow passage;
a second flow passage in fluid communication with the second dampening chamber and the second chamber; and
a controller coupled with the first flow control valve and configured to facilitate operation of the first flow control valve to change the flow rate of fluid through the first flow passage.

17. The vehicular fluid damper system of claim 16 further comprising a second flow control valve in fluid communication with the second flow passage and operable to control a flow rate of fluid through the second flow passage, the controller being coupled with the second flow control valve and configured to facilitate operation of the second flow control valve to change the flow rate of fluid through the second flow passage.

18. The vehicular fluid damper system of claim 16 wherein the static fluid damper further comprises:
  a third valve configured to selectively permit fluid flow from the second dampening chamber to the third dampening chamber and to prohibit fluid flow from the third dampening chamber to the second dampening chamber; and
  a fourth valve configured to selectively permit fluid flow from the third dampening chamber to the second dampening chamber and to prohibit fluid flow from the second dampening chamber to the third dampening chamber.

19. The vehicular fluid damper system of claim 16 wherein the static fluid damper further comprises:
  a first inner wall disposed between the first and second dampening chambers and defining a first orifice; and
  a second inner wall disposed between the second and third dampening chambers and defining a second orifice.

20. The vehicular fluid damper system of claim 19 wherein the static fluid damper comprises a sidewall and the first and second inner walls are substantially perpendicular to the sidewall.

* * * * *